UNITED STATES PATENT OFFICE.

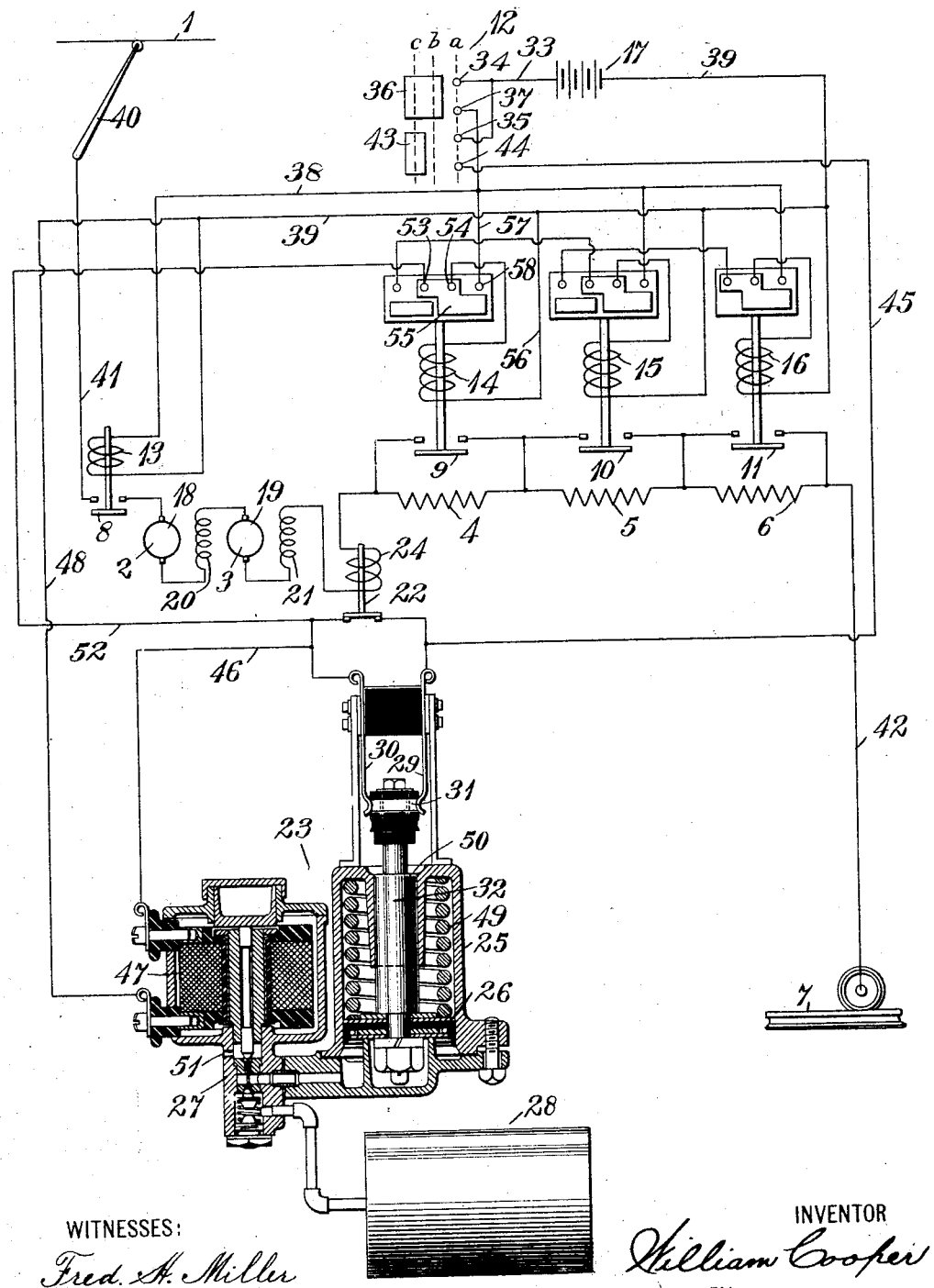

WILLIAM COOPER, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

No. 889,907.     Specification of Letters Patent.     Patented June 9, 1908.

Application filed September 3, 1907. Serial No. 391,223.

*To all whom it may concern:*

Be it known that I, WILLIAM COOPER, a citizen of the United States, and a resident of Pittsburg, in the county of Allegheny and State of Pennsylvania, have invented a new and useful Improvement in Systems of Electric-Motor Control, of which the following is a specification.

My invention relates to systems of electric motor control and it has special reference to systems which embody means for effecting an automatic acceleration of the motors.

The object of my invention is to so combine, in a single system, a time-limiting device with a device which is dependent upon the current traversing the motor circuits, as to effect the best possible results under widely varying conditions of load.

Limit switches are often used in connection with control systems for electric vehicles, for the purpose of suspending the automatic acceleration of the motors when the current traversing the motor circuits exceeds a predetermined amount in order to protect the motors from injury and to prevent wide fluctuations of the line current. In a co-pending application Serial No. 304,463, I have shown and described a system embodying a multiple limit switch for the purpose of effecting a certain degree of adjustment according as the load on the motors of a locomotive or other vehicle is large or small. In the aforesaid system, the proper limit switch was selected by the attendant and in similar systems it sometimes happens that, under very heavy loads, the motors fail to accelerate, because the current traversing the motor circuits continues at a value sufficient to hold the limit switch or switches open.

According to my present invention, I employ a single limit switch so that the control circuits are materially simplified and, in connection therewith, I provide a time-limit relay which becomes active when the current limit switch is opened and permits the acceleration of the motors to proceed at a rate, the maximum of which may be so regulated as to afford sufficient protection for the motors under extreme service conditions.

The single figure of the accompanying drawing is a diagrammatic view of a system arranged in accordance with my invention, the time-limit device embodied therein being shown in section in order that its operation may be more clearly understood.

Referring to the drawing, electrical energy is supplied from a trolley or other supply conductor 1 to motors 2 and 3, circuit connections being first completed through resistance sections 4, 5, and 6 and a rail or negative line conductor 7. The motor-circuit connections and resistance sections are controlled by a plurality of switches 8, 9, 10, and 11 which are governed by a master controller 12, and are respectively operated by electro-magnets 13, 14, 15, and 16 which are energized by current from a storage battery 17.

It will, of course, be understood that the control circuits may be supplied from any suitable source of energy and that the switches may be operated pneumatically or by any other suitable means, within the scope of my invention.

The motors 2 and 3 comprise armatures 18 and 19 and field magnet windings 20 and 21 and the acceleration of the motors may be retarded by a limit switch 22 and a time-limiting device 23. The limit switch 22 is provided with a magnet winding 24 which is connected in series with the motor circuit between the field magnet winding 21 and the resistance 4.

The time-limiting device 23 comprises a pneumatic cylinder 25 and a piston 26 which operates therein, an electrically operated magnet valve 27 which controls the admission of fluid pressure from a storage reservoir 28 to the cylinder 25, stationary contact fingers 29 and 30 and a movable contact member 31 which is mounted on a piston rod 32.

The operation of, and the circuit connections for, the system are as follows: Assuming that the master controller 12 is moved from its "off" position $a$, to a position $c$, a control circuit is first established from the battery 17 through a conductor 33 to the contact fingers 34 and 35. Circuit is continued from contact finger 34 through contact member 36, contact finger 37, conductor 38, magnet winding 13 of the switch 8 and negative battery conductor 39. The switch 8 is thus closed and a motor circuit is established from the supply conductor 1 through a trolley 40, conductor 41, switch 8, motors 2 and 3, magnet winding 24, resistances 4, 5, and 6 and conductor 42 to the negative line conductor 7.

If the current traversing the motor circuit exceeds a predetermined amount the limit switch will open, and will remain open until the speed and counter-electromotive force of the motor have increased sufficiently to reduce the current to its normal value. If it is assumed that the motors are so heavily loaded that the limit switch is kept open for a considerable length of time, the resistance sections 4, 5, and 6 will be gradually short-circuited, the intervals between the closure of the several switches being determined by the time-limiting device 23. Circuit connections are here established as follows: From the contact finger 35 a control circuit is completed through contact member 43, contact finger 44, conductor 45, contact fingers 29 and 30 (which are normally bridged by contact member 31), conductor 46, magnet winding 47, of the valve magnet 27 and the conductor 48 to the negative battery conductor 39. The magnet valve 27 is opened by the winding 47, when it is energized, and fluid pressure is admitted from the reservoir 28 through the valve 27 to the cylinder 25, whereupon the piston 26 is actuated in opposition to a spring 49 and a piston rod 32 is moved outwardly until a collar 50 comes into engagement with the contact member 31. By this means, the circuit completed through the contact fingers 29 and 30 is interrupted just at the end of the piston stroke. The arrangement of parts is such that the piston is raised in a very short time but, as soon as the circuit through magnet winding 47 is interrupted, the valve 27 is closed and the fluid pressure in the cylinder 25 is allowed to escape slowly through a small exhaust port 51.

The interruption of the circuit at the contact members 29 and 30 has no effect upon the accelerating switches 9, 10, and 11, provided the limit switch 22 is closed but, if this switch is open, the closure of each switch is delayed until the contact member 31 is returned into engagement with its contact fingers 29 and 30, a circuit being then established through conductor 45, contact fingers 29 and 30, conductor 52, contact fingers 53 and 54 (which are bridged by contact member 55 when switch 9 is open), magnet winding 14 and a conductor 56 to the negative battery conductor 39.

As soon as the switch 9 is closed its magnet winding is transferred to a holding circuit, according to a well known practice, the aforesaid circuit being established from contact finger 37 through conductor 57, contact fingers 58 and 54 (which are bridged by a contact member 55 when the switch 9 is closed), magnet winding 14 and conductor 56 to the negative battery conductor 39.

As soon as the contact member 31 is returned to its original position of engagement with the contact fingers 29 and 30 the magnet winding 47 is again energized and the action of the time-limiting device is repeated, a single one of the accelerating switches being allowed to close each time the contact member 31 engages the fingers 29 and 30.

According to the usual method, it is possible for the attendant or motorman to suspend the acceleration of the motors indefinitely at any point by moving the controller to the position $b$ from the position $c$. In this position, contact fingers 35 and 44 are disengaged from the contact member 43 and, consequently, the limiting devices 22 and 23 are both inoperative.

The principal utility of my invention will be found in electric railway service where cars are often started on grades and curves, it being necessary, in order to obtain the desired acceleration in such cases, to supply a current to the motors far in excess of normal full load. It is possible to short-circuit the resistance sections 4, 5, and 6 in a very short time if the current traversing the motor circuits does not exceed a predetermined amount sufficient to open the current limit switch 22.

An electro-magnet combined with a dash pot may be employed in lieu of the time limit relay illustrated in the drawing and the circuit connections of the system may be varied within the scope of my invention. I desire, therefore, that only such limitations be imposed as are indicated in the appended claims.

I claim as my invention:

1. In a system of electric motor control, the combination with means for effecting the motor acceleration, of means dependent upon the current traversing the motor circuit for automatically confining the motor acceleration to a predetermined time interval.

2. In a system of electric motor control, the combination with a plurality of independently operated switches adapted to close in a predetermined sequence, of means dependent upon the current traversing the motor circuit for automatically suspending the closure of the switches and means for limiting the suspension to a predetermined maximum time.

3. In a system of electric motor control, the combination with a current-limit device, of a time-limit device for overcoming the effect of the current-limit device after a definite length of time.

4. In a system of electric motor control, the combination with means for effecting the automatic acceleration of the motors, of a device for delaying the acceleration for a predetermined length of time and automatic means dependent upon the current traversing the motor circuit for rendering the limiting device active.

5. In a system of electric motor control, the combination with a plurality of independently operated switches adapted to close in a predetermined sequence, of means dependent upon the current traversing the motor circuit for suspending the closure of the switches at any point in the sequence and other means for overcoming the effect of the suspending means after a predetermined interval of time.

6. In a system of electric motor control, the combination with a plurality of independently operated accelerating switches, of a limit switch dependent upon a predetermined motor current for suspending the closure of the switches at any point in the sequence and a time-limiting device for permitting the acceleration to continue independently of the limit switch after a predetermined length of time.

7. In a system of electric motor control, the combination with a plurality of independently operated switches adapted to close in a predetermined sequence, of an electropneumatic time-limiting device for automatically delaying the closure of each successive switch for a definite length of time.

8. In a system of electric motor control, the combination with a plurality of independently operated switches adapted to close in a predetermined sequence, of a cylinder, a piston operating therein, an electro-magnet valve for controlling the fluid pressure in the cylinder and a contact member attached to the piston, said contact member being adapted to automatically delay the closure of the switches.

9. In a system of electric motor control, the combination with a plurality of independently operated switches adapted to close in a predetermined sequence, and actuating and holding circuits therefor, of independent means for interrupting the actuating circuit to delay the closure of the switches, the delay caused by one of said means being for definite lengths of time and occurring between the closure of the switches.

10. In a system of electric motor control, the combination with a plurality of independently operated switches adapted to close in a predetermined sequence, and actuating and holding circuits therefor, of independent means for interrupting the actuating circuit to delay the closure of the switches, the delay caused by one of said means being for definite lengths of time and occurring between the closure of the switches and the delay caused by the other means being dependent upon the current traversing the motor circuit.

In testimony whereof, I have hereunto subscribed my name this 24th day of August, 1907.

WILLIAM COOPER.

Witnesses:
   HOWARD L. BEACH,
   BIRNEY HINES.